Sept. 9, 1969      L. A. KLUTH ET AL      3,465,590
THERMOMETER
Filed Aug. 22, 1960      2 Sheets-Sheet 1
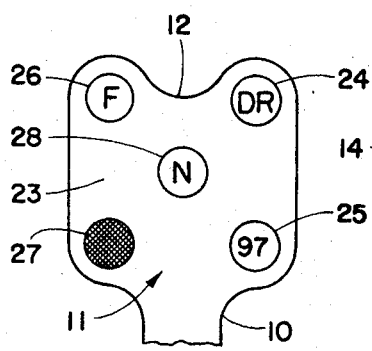
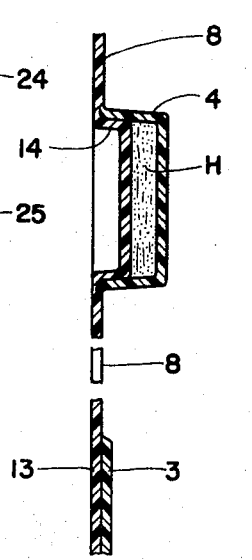
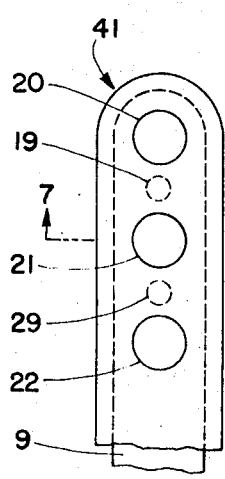
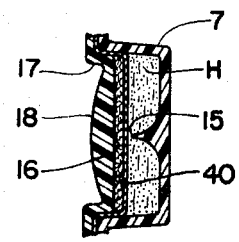
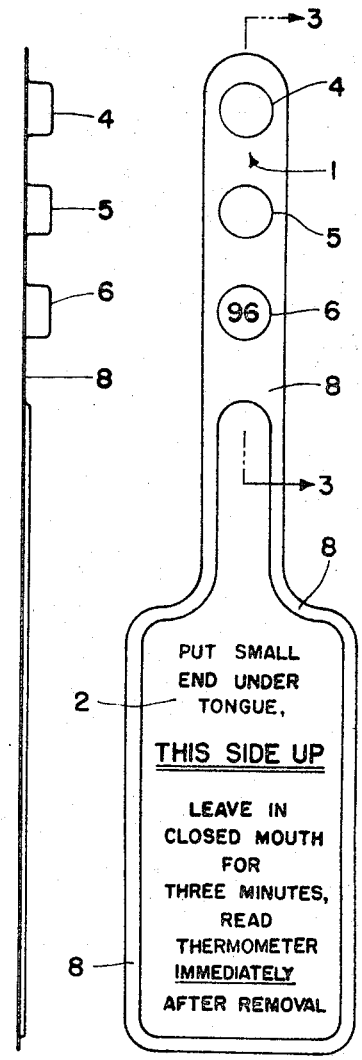
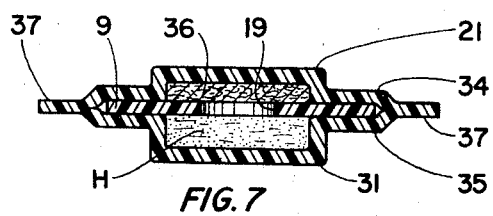
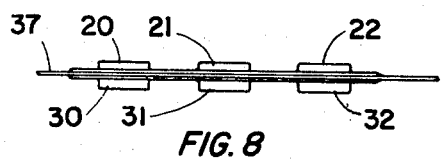
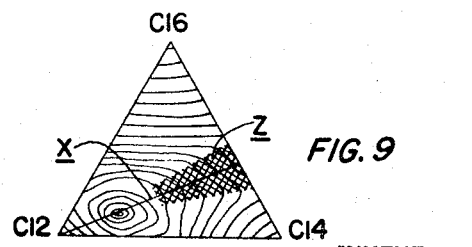
INVENTORS
Lewis A. Kluth
Richard J. Melville
Robert D. Thompson
BY P. J. Young, Jr.

United States Patent Office 3,465,590
Patented Sept. 9, 1969

3,465,590
THERMOMETER
Lewis A. Kluth, Hilton, Richard J. Melville, Rochester, and Robert D. Thompson, Penfield, N.Y., assignors, by mesne assignments, to Taylor Instrument Consumer Products Division of Sybron Corporation, Arden, North Carolina
Filed Aug. 22, 1960, Ser. No. 50,894
Int. Cl. G01k 11/12
U.S. Cl. 73—356        31 Claims

ABSTRACT OF THE DISCLOSURE

An oral thermometer having a flat portion to be inserted in the mouth and handle projecting from the flat portion. Mounted on the flat portion are a plurality of pockets, each of which contains a saturated fatty acid mixture which changes state at a specific temperature. By varying the mixture in the various pockets so that each responds at a different temperature, the body temperature may be read.

---

This invention relates to a novel thermometer particularly suited for the measurement of human temperatures.

While many types of thermometric devices have been proposed, having human temperature measurement as the particular object of their use, the mercury-in-glass "clinical thermometer" has long dominated the field of human temperature measurement.

According to our invention, there is provided a thermometer having such characteristics as not only to enable it to supplant the conventional clinical thermometer, in many cases, but also to expand the practice of human temperature measurement.

As will be seen hereinafter, there are many instances of human temperature measurement where the precision, fragility, cost, and maintenance and use problems of the conventional clinical thermometer could well be dispensed with in favor of characteristics such as lesser precision, greater durability, cheapness, ease of use and freedom from need for maintenance.

Again, the above-mentioned characteristics of the conventional clinical thermometer discourage lay practice of temperature measurement even though, in many cases of possible illness, it is the only objective way the lay user has of determining whether or not a feeling of indisposition warrants the attention of a doctor. Some potential and present lay users object to the dangers involved in breakage while the thermometer is being used. Others object to the expense factor in which both unit cost and fragility figure. The recommended practices of disinfection, cleansing, shaking down, using and reading add up to a troublesome routine. The precision itself, which involves imposing on the user the often-difficult task of lining up a hair's breadth of mercury with a built-in lens in orders to read the thermometer at all, and which is the result of time-consuming and expensive manufacturing procedures, is more than the lay user needs (if, indeed, the lay user can utilize it fully, insofar as are concerned making and reading the measurement per se) to find out if a significantly abnormal temperature obtains.

In contrast to the foregoing, our novel thermometer has the desirable characteristics mentioned previously. It has only the precision necessary for many instances where, heretofore, the conventional clinical thermometer has been or would have been used. For example, where used to detect feverish states, it may simply indicate to the user whether the temperature measured is above or below 99° F., and above or below 101° F., and this information is conveyed practically as such to the user without resort to reading the end of a mercury column against a scale. It is practically unbreakable in use because it may be made mainly of about 0.5 gram of tough, inert plastic. Its construction is such that it can be inexpensively mass-produced without calibration of the individual units. No cleaning or disinfecting practices need be observed, since it can be made and packaged sterilely, so that the user may take the thermometer (sterile) from its package, use it once and then throw it away.

The above-mentioned desirable characteristics of our novel thermometer are on the whole due to the fact that it belongs to that class of thermometers including a heat-sensitive means that undergoes a change, physical and/or chemical, when it attains a certain temperature, said change being such that its occurrence can be detected without resort to the notion of relating such change to a substantially continuous scale expressed in terms of the extent of such change.

The occurrence of many types of changes of state of various materials can readily be determined visually, for example, liquefaction, solidification, sublimation, chemical reaction (as where a color change results), condensation, boiling, and so on. Hence, if a material exhibiting one of these phenomena is supported in thermal contact with a body or entity, the temperature of which is to be ascertained in some sense, and is allowed to come to thermal equilibrium with said body, or entity, the said material will reveal, by its state, the relationship of the temperature of said body or entity, to the change of state temperature of said material, such relationship being, of course, either "equal to or less than" or, "equal to or more than." With two materials of different change of state temperatures, an indication of "between" said temperatures also becomes possible. In theory, at least, a given temperature interval may be divided as finely as desired by increasing the number of materials and selecting the materials so that each has a change of state temperature falling in said interval but different from the change of state temperature of each of the other materials.

Insofar as we can determine, we are the first to provide a thermometer of the change of state type, i.e., a support or carrier including heat-sensitive material of and suited for use in the accepted and classical manner of medical thermometry, namely, insertion within the human body.

It appears that prior art thermometers using the change of state principle are not well adapted to the task of detecting, with precision and reliability, temperatures occurring in the short span encompassed by the range from sub-normal temperature to high fever, or, in general, temperatures of like order. However, general medical usage requires that a clinical thermometer be accurate to from two-tenths to one-half of a Fahrenheit degree. Legislative and professional standards have long enforced manufacture of clinical thermometers of a quality consistent with such usage.

While, depending on the precision and reliability expected, a number of heat-sensitive substances are known to exist that could be used in our novel thermometer, we have discovered that a certain group of chemicals, known as the even series of saturated fatty acids, can be utilized to provide, by melting, indications of temperatures within the human body range which indications are reliable to one-half of a Fahrenheit degree or better. As will be shown later, the said group of chemicals are so superior from practically all points of view to any other substance known to the art, as to be ideal for our purposes.

Since our novel thermometer is not conceived by us as an absolute substitute for the conventional mercury-in-glass clinical thermometer, the more approximate indications that are afforded by fatty-acid materials, or the like, more than suffice for the purposes of our invention, which require reliability of indication and ease and economy of use and manufacture, rather than exactness of indication. Moreover, in recent years there has been some indication that up to half-degree variations in Fahrenheit temperature are not medically considered, in general, to be of much clinical significance.

In brief, the essential structure of our novel thermometer consists of a carrier, said carrier being proportioned and shaped to carry or support state-changing, heat-sensitive material and to support the said material in temperature-sensing relation to the body or entity, the temperature of which is to be measured, and state-changing, heat-sensitive material so carried or supported by said carrier. In one case, the said carrier may be a pair of transparent plastic laminae between which is sandwiched state-changing, heat-sensitive material, said material being arranged so that any change in state thereof may readily be seen by the naked eye.

Within the area of use for which the relative precision of our novel thermometer is suited, it is obviously superior to the conventional glass thermometer having a body of mercury or other liquid therein as a heat-sensitive element, since, given suitable heat-sensitive material that changes state as required, the process of manufacturing our thermometer amounts to nothing but forming, filling, sealing and packaging a receptacle, the result being a finished product that, compared to its conventional counterparts, is unbreakable, and very inexpensive, needs no maintenance, and is very easy to use properly.

It is interesting to note that manufacture of a mercury-in-glass clinical thermometer follows the same basic routine. However, unlike our novel thermometer, each conventional clinical thermometer requires individual attention such as relating the quantity of mercury to bore-size, constriction-forming, and numerous other special, individual attentions of a quantitative nature, none of which have any counterpart in the routine followed in making our thermometer. The only analogous, quantitative aspect involved in making our thermometer is filling small predetermined quantities of heat-sensitive material into a number of containers or receptacles. The proportioning of the fill to the receptacle and the proportioning of the receptacle itself need be no better than would be conventionally expected of mass-production machinery designed to perform forming, filling, and sealing operations and, hence, individual attention, in production, to our novel thermometer is entirely unnecessary.

It will be evident from the foregoing that one object of our invention is to provide a novel clinical thermometer including a heat-sensitive substance arranged so that when exposed to a predetermined body temperature said substance will undergo a physical, a chemical, or a physicochemical change, the occurrence of which is readily detectable without resort to quantitative measurements relative to a scale of lengths.

It is a further object of our invention to provide a novel clinical thermometer that is reliable, and is cheaper, more durable, and safer and easier to use and manufacture than the conventional clinical thermometer.

Another object of our invention is to provide a novel thermometer utilizing saturated fatty acids as indicating substances.

Finally, while other specific objects of our invention will become apparent from the detailed description thereof, infra, the overall object of our invention is to provide generally useful improvements in change of state thermometers.

In the drawings:

FIGURE 1 is a plan view of our novel thermometer;

FIGURE 2 is a view in profile of the thermometer of FIGURE 1;

FIGURE 3 is a fragmentary view of a section taken along the line 3—3, FIGURE 1;

FIGURE 4 is a plan view of a modification;

FIGURE 5 is a partial section of a further modification of our invention;

FIGURE 6 is a partial plan view of still another modification of the thermometer shown in FIGURE 1;

FIGURE 7 is a section on the line 7—7 of FIGURE 6;

FIGURE 8 is a partial view in profile of the thermometer shown in FIGURE 6; and

FIGURE 9 is a diagram of a ternary phase system of fatty acids;

Figure 10:
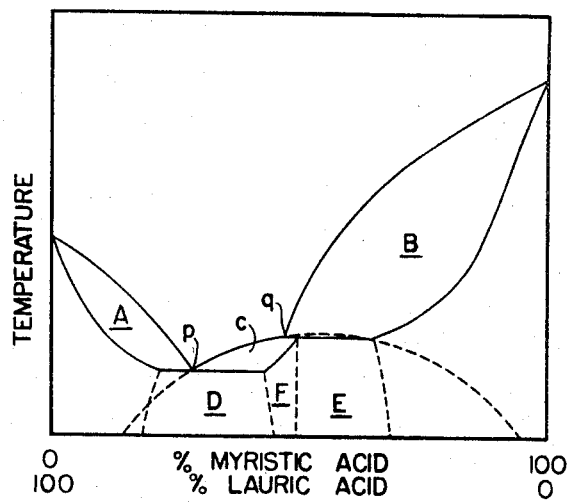
FIGURE 10 is a diagram of a binary phase system of fatty acids.

In the drawings, the relative proportions of the various figures may be taken as a guide to constructional dimensions, although thicknesses of material have been slightly exaggerated for clarity of illustration, where necessary. For example, the length of the thermometer of FIGURE 1, along its axis of symmetry, is preferably three and three-quarter inches, whereas its overall thickness, taking the point of view of FIGURE 2, would run from about 0.005 inch to about 0.01 inch, save at the three projecting elements thereof. Thus, FIGURES 1, 2, 4, 6 and 8 are taken to a common scale, save that material thicknesses are exaggerated relative to said scale in FIGURES 2 and 8. FIGURES 3, 5 and 7 are also taken to a common scale, different from the scale of FIGURES 1, 2, 4, 6 and 8, and again material thicknesses, where necessary, are exaggerated for clarity of illustration.

For oral use, the preferred form of our novel thermometer is as shown in FIGURES 1 and 2. As will be seen from FIGURE 1, the main structure of the instrument comprises a relatively narrow, elongated, probe or carrier portion 1 and a broader handle portion 2. As indicated by FIGURE 3, the structure of FIGURE 1 is made up of a lamina 3 and a lamina 13. Each lamina is generally flat except that lamina 3 has pockets 4, 5 and 6 projecting from one side thereof, and that lamina 13 has three pockets (only one thereof—pocket 14—being shown) projecting from one side thereof. Lamina 13 is positioned on top of lamina 3 with its three pockets registering with pockets 4, 5 and 6, the said pockets being dimensioned so that the pockets of lamina 13 nest snugly in pockets 4, 5 and 6, but with pocket depths being proportioned so as to leave a space between each pocket of lamina 13 and the bottom of the pocket of lamina 3 in which the former said pocket nests. Laminae 3 and 13 are otherwise identical as to form, proportions and arrangement of pockets thereon, and they are sandwiched together to form a laminated structure in which the adjacent surfaces of the laminae are everywhere in contact with each other except at pocket bottoms.

Each interpocket space, i.e., the space between the bottoms of a pair of nesting pockets, is provided with a deposit of heat-sensitive material H that substantially fills the said space and covers the whole area of the pocket bottoms. Heat-sensitive material H is of a type that visibly changes state at a predetermined temperature, and each of the interpocket spaces has a material H therein having a different change of state temperature.

Since the state of the pockets is to be determined by visual inspection, it is necessary to make at least the bottoms of one set of pockets transparent. Conveniently, this is done by forming both of the pocketed laminae from a heat-sealable and workable, moisture-impervious, tough, inert, flexible, transparent plastic such as unplasticized polyvinyl chloride, since this permits construction of the unit in a form in which the contents of each interpocket space is hermetically retained in place free of contamination from the contents of other pockets, and from the exterior environment, and, as well, prevents escape of the said materials to the exterior environment, and assures that the unit will be more or ess unbreakable and free from attack otherwise from the physical and chemical effects to which the unit may be expected to be exposed. The various indented or thinned out portions 8 shown in FIGURES 1, 2 and 3 indicate the thinning out of the plastic material as the result of heat sealing around the contours of the pockets and around the unit as a whole and also indicate the places where the adjacent surfaces of the laminae would be welded together by the heat sealing process. At the places of heat sealing, the laminae substantially indistinguishably weld together to about the thickness of one lamina. At the unwelded places, mainly in the intermediate part of handle 2, the laminae belly out slightly to a little more than twice the thickness of a single laminae.

Preferably, the materials H are such that they change from an opaque solid state to a transparent liquid state sharply and stably at the desired temperatures. For oral purposes, it is desirable that such changes be reliable to one-half of a degree Fahrenheit and that such precision be stably maintained under unfavorable conditions of shipping, storage, or shelf life in the period between manufacture and use of an instrument utilizing the material H.

Likewise, the materials should be non-toxic even though sealed into the laminae structure. By way of example, the following heat-sensitive mixtures of saturated fatty acids fulfill the foregoing requirements:

| Temperature indicated by complete fusion (° F.) | Melting point | Composition |
| --- | --- | --- |
| 96+ | 96.0±0.5 | 40.0% myristic acid, 60.0% lauric acid. |
| 99+ | 99.0±0.5 | 29.0% palmitic acid, 37.1% myristic acid, 33.9% lauric acid. |
| 101+ | 101.0±0.5 | 29.5% palmitic acid, 40.0% myristic acid, 30.5% lauric acid. |

In this table, the plus signs signify, not an uncertainty as to melting point, but the fact that if a sample of one of the mixtures is completely melted without observing how and when the fusion process occurs, the subsequent observation of complete fusion in the said sample signifies only that a given temperature has been attained and, perhaps, surpassed. As will be seen later, the temperature numerics given in the table may or may not coincide with what one may choose to define as "melting point." In this case, for purposes of preparing the mixture, the temperature of a sample at the instant it is observed to just completely liquefy and turn clear is taken as the melting point.

To put our novel thermometer on a par with the conventional clinical thermometers as to the nominal three-minute response time of the latter, the thickness and mass of the plastic laminae and the layers of heat-sensitive material H must be properly proportioned. For example, 0.005 inch thick unplasticized polyvinyl chloride laminae, 0.03 inch layers of fatty acid materials (a total mass of about 0.5 gram) are proportions that have been found to be satisfactory as to response time characteristics.

While the given dimensions of laminae and heat-sensitive material layers are not critical, they represent a necessary compromise of various factors that affect heat transfer to and from the thermometer, and/or affect its indicating characteristics. If the fatty acid layers are too thin, they tend to reveal the indicia even when solid. Again, too great a thickness and/or mass of the layers of heat-sensitive material, and/or of the plastic laminae, will make the response time too long. On the other hand, given a particular lamina material, the probe portion must be sufficiently massive that the amount of heat absorbed by the instrument and the rate of loss therefrom, after removal from the mouth, be such as to allow a comfortable amount of time within which the device can be read without fear of the reading being affected by extra-oral temperature conditions. The proportions just given assure that three minutes oral placement in the manner of a conventional thermometer in practically all individuals will bring the contents of the interpocket spaces to the maximum oral temperature possible, and that enough reading time is available after removal of the instrument from the mouth.

Likewise, the proportions of the mixtures H are partly determined by the depths thereof in the pockets. For example, the proportions set out in the table are determined on the basis of 0.03 inch depth of material. However, if, say, 0.02 inch depth were used, the proportions would be varied slightly in a sense as to increase melting point. For example, a 28.5% palmitic, 36.6% myristic, 34.9% lauric mixture in 0.04 inch depth behaves, relative to the indicated temperature 99° F., substantially exactly as does the 99° F. mixture in the table, supra, in 0.03 inch depth.

Though easily flexed to a configuration intimately contacting the various mouth parts and tissues enveloping it in use, the novel thermometer is neither slack nor flimsy (if constructed to about the above-indicated specifications) but, with a slight curvature due to the sealing process, it stably maintains the form shown, and is tough enough to resist all but the most determined efforts to tear or otherwise damage it by force.

Sealing the material H within a reasonably durable carrier structure such as that disclosed, assures stability of operation of the finished unit, unless the unit is so abused that its gross structure is destroyed or otherwise radically altered. More insidious, however, is the possible effect of thermal and other influences between use and manufacture. In particular, if a sample of melting-type heat-sensitive material H is brought to a partly molten, partly solid condition and crystallized after days of being held in such state, a change in its nominal point may be observed the next time it is caused to melt. Mixtures are particularly prone to act in this fashion. However, each of the mixtures listed in the table, supra, will not deviate from its nominal melting point (determined, say, in relative short term trials in which the temperatures involved are either definitely above the melting point of the mixture, or definitely below it) by more than one-half of a Fahrenheit degree even after a day or more inpartly molten, partly solid state, followed by slow crystallization.

In the preferred form of the invention, the indicia 96, 99 and 101 are printed in white on a contrasting background on the bottoms of the pockets of lamina 13, next adjacent the materials H. The fatty acid materials H are white when solid, hence, if the numeral is white on a contrasting background, melting must be relatively far advanced before the numeral is clearly revealed. If the said background is white or light, and the numeral dark, it may not always be definitely obscured when it should. Although the "melting point" of a sample of material H may be defined as the minimum temperature at which it is perfectly clear with no undissolved crystals, in reality, melting may begin at a temperature as much as about a Fahrenheit degree lower. The fatty acids in solid form have a flaky or feathery, somewhat elongated, crystal structure, and thin layers thereof have a waxy, slightly-translucent, white apperance. Thin layers of the solid layers just beginning to melt or layers of the liquid plus undissolved crystals, may permit a vivid marking to be made out by eye before the desired endpoint-complete melting has been reached.

With a vivid background, red, say, and a white numeral thereon, however, the material H must be several tenths of a Fahrenheit degree warmer to reveal a numeral under an 0.03 inch thick layer thereof, than it need be to reveal a dark numeral on a light background. Preferably, this color scheme is achieved by forming lamina 13 from unplasticized polyvinyl chloride plastic that has been made a dense red in manufacture, printing the numerals on the projecting bottoms of the pockets of lamina 13 and forming lamina 3 from transparent plastic. Naturally, the coloring matters involved should not contaminate the heat-sensitive materials H. It is desirable that the background coloring conceal the numerals from view through the material of lamina 13.

As can be seen from the legend on handle 2, FIGURE 1, the novel thermometer is used exactly like the conventional clinical thermometer, in respect, that is, of positioning the thermometer orally, and, as implied by the figure, the thermometer has been used and the contents of the 96° F. pocket have melted.

The 96° F. reading is not intended to tell the average user so much about his exact oral temperature as to orient him as to proper use of the thermometer. It appears that 96° F. is about the highest temperature which some "normally" healthy users can be depended upon to impart to the 96° material in three minutes, so the 96° F. material H is chosen on the basis that it melts completely at the temperautre of 96° F.

While the particular materials used are said to be sharp melting, actually, they begin to melt as much as a half degree below the temperature at which they will be melted to perfect transparency. A person with a 98.6 ° F. temperature—"normal"—may be able to detect melting in the 99° F. material. However, if he has the numeral 96 perfectly visible as a white outline on a dark field, he will not be faced with the puzzle as to whether he should attribute any significance to a slight translucency of the 99° material, since he has the 96° reading for purposes of comparison, and since the 99° material must advance several tenths of a Fahrenheit degree into its melting range in order to make the white 99 legible.

In contrast to the above-given interpretative significance of the 96° F. reading, it is possible to interpret visible changes in the state of the 99° F. material in such a way as to obtain more precise information as to the state of the average user's oral temperature in relation to his "normal" oral temperature. This can be done because three stages of melting of the heat-sensitive material H can be distinguished. In the first stage, enough melting occurs that the numeral would be readable therethrough, if the numeral and its background were designed for optimum contrast therebetween (for example, a black numeral on a yellow ground) and optimum visibility through a pearly translucence of partly melted material H or through a flocculent suspension of crytals of solid material in liquid material H. The next stage is characterized by fact that during it (but not before), the preferred white numeral on a dark field would also become definitely legible. The third stage would be that of complete transparency of the material H. These three stages cover about two Fahrenheit degrees, and the third stage, for the preferred fatty acid materials, occurs in a temperature interval that can be localized to about one-half of a Fahrenheit degree. The second stage can be localized in a corresponding half-degree interval about halfway through the two degree or so interval during which occurs the entire fusion process, by using the white numeral on a dark field and dimensions of the elements of the thermometer such that if the second stage is reached, and the instrument is exposed to external conditions, i.e., it is removed from the mouth to be read, heat is lost quickly enough that the 99° material reverts to the first stage in a few seconds.

The first stage can also be localized in like fashion by careful scrutiny, but insofar as the average user is concerned, it is not intended to count, and he will be told to interpret indications on the simpler and easier basis of whether or not a numeral, or several numerals, can be read. The first stage, however, has quantitative meaning for an observer trained to detect changes in translucence of the heat-sensitive material when melting begins.

Using the particular plastic and fatty acid materials, in the proportions and dimensions specified, supra, and with light numerals on a dark red field, the said three stages of melting occur as set forth, and indicate, at transparency, 96° F., 99° F. and 101° F., respectively.

Since the 99° reading is intended to signify a slight temperature (relative to 98.6 as "normal" that is) it is obvious that a "true" (99.0+0.5)° F. mixture could indicate attainment of 99° F. for a slightly lower temperature. This possibility can be obviated by adjusting the proportions of the 99° F. mixture slightly so as to make the "true" melting point a few tenths higher, say 99.5° F.

Although the 99° F. reading would then be more a 99.5° reading, it would be preferable to retain the 99 numeral, for simplicity of indication. Furthermore, "99.5" would take up more of the restricted pocket-bottom area available for indicia than even the number "101," hence, in the interest of legibility, it is preferable to use "99," instead. (96 and 101 readings actually denote third stage melting advanced by temperature increase just to the point of complete transparency, but 95.5 and 100.5 could replace them on the basis of second stage characteristics, if decimals and greater lengths were not objctionable.)

Since the conventional "normal" for most people is between 98.5° F. and 99.0° F., and since this "normal" may vary about one-half of a Fahrenheit degree or more (due to excitement, exertion, nervousness and other extraneous influences which may cause oral temperature variations) without being sympaomatic of illness, such people may achieve the said second stage of melting of the 99° material in using our novel thermometer.

Such people as these, i.e., the average users, would be counted as normal if they got at least to the third stage 96° F. reading, but no further than the second stage 99° F. reading. However, if this type of subject achieves the third stage of the 99° F. reading, he definitely has a slight fever. Moreover, if the third stage 99° F. reading is achieved, but not the second stage of the 101° F. reading, the longer the 99 numeral remains visible, after removal of the thermometer for reading, the more the user's temperature has surpassed 99.0° F. and the closer it is to about 100.5° F.

Taking substantially the full human range of "normal" temperatures into consideration, it is a fact that the interpretation of human temperature measurements is as much dependent on individual physiology as on the preciseness and degree of shading of the numbers obtained from such measurements. For some individuals, just barely making the 96° F. reading, visible, is normal, just barely making the 99° F. reading visible signifies a definite fever that cannot be explained away by assigning the thermal condition, thus revealed, to extraneous influences per se having no bearing on the state of health of such individual, and anything higher strongly suggests seeking medical attention. Hence, insofar as these users are concerned, the behavior of the 96° F. material is for them what the behavior of the 99° F. material is for the average user.

From what has been said supra, it is evident that one design consideration is to take advantage of what the average (or potential) user may be expected to know (or learn easily) as to use of a conventional thermometer, namely, putting the bulb under and to one side of the tongue, keeping it there three minutes, and making readings of a numerical character. From this point of view, it will be seen that the main difference is that with our novel thermometer, the user has only a few possible numbers to interpret, whereas with the conventional thermometer, the user can get any one of a theoretically-infinite number of indications.

At first sight, such difference suggests that the conventional clinical thermometer may possess some corresponding advantage that our novel thermometer lacks by reason of its few "more than" and "less than" types of readings. However, insofar as the lay user is concerned, no such advantage ordinarily exists, since it is not the temperature numbers that are significant, but their interpretation. Given a temperature number, all that the lay user can say is that it indicates, say, no fever, a little fever, or a lot of fever. All in all, however, our novel thermometer will tell him just that much, but without embroiling the user in the problems and difficulties entailed by the maintenance and use of the conventional clincial thermometer.

The apparent advantage of the conventional clinical thermometer's precision is therefore somewhat an illusion. While the conventional thermometer's maximum registering feature remains as an advantage not possessed by our novel thermometer, even this is as much as anything else a back-handed tribute to the difficulty and time involved in taking a reading of the conventional thermometer and to its relatively-fast response to temperature (the average so-called "three-minute" conventional clinical thermometer actually needs only about a minute and a half to substantially complete its response).

We are not suggesting that conventional notions of precision, as to human temperature measurement, are invariably superfluous, or too restrictive, since that is not the case. For example, at 101° F. and up, tenths of a Fahrenheit degree temperature variations generally are considered medically significant, irrespective of cause, so that here the precision of the conventional clinical thermometer is useful, if the course of such temperature conditions need be observed. The main use of our novel thermometer, however, is to ascertain whether a subject of temperature measurement is or is not in a critical condition such as to indicate that it would be well if medical attention for the subject were sought. As will be seen later, such use of our novel thermometer is essentially a screening-type of use, that has wide application in the home, clinically and institutionally, by both lay and professional people, and by the subjects of temperature measurement themselves.

In the event that a thermometer according to our invention having a larger range and number of indications are desired, or more indications in the 96° F. to 101° F. range, the number of pairs of pockets may be increased, as by lengthening the probe portion 1, or by decreasing pocket size so that more pockets may be ranged in tandem on a given size of probe portion. However, the depth of oral insertion limits the extent of such lengthening, and legibility and ease of reading are in proportion to the amount of pocket area available for displaying temperature numbers. For our purposes, the best dimensions from the point of view of reading, oral insertion, manufacturing, and so on, are as indicated by the proportions of FIGURE 1, taking the length of the thermometer thus illustrated as 3¾ inches from tip of probe to end of the handle. This is about as small as practical if use on all people but infants is contemplated. Hence, we prefer to provide for more indications by modifying the probe shape as indicated in FIGURE 4, wherein numeral 11 denotes the modified probe.

Since the overall construction of a thermometer having a modified probe portion, such as shown in FIGURE 4, would be otherwise identical to that of the instrument illustrated in FIGURES 1, 2 and 3, only the probe 11 itself is shown in FIGURE 4. That is, such a thermometer would be of the same overall dimensions and shape as the thermometer of FIGURES 1, 2 and 3, save to the extent such characteristics must be modified to accommodate a larger number of pockets. Otherwise, the basic structure would be that of a pair of pocketed lamina sandwiched together with the pockets of one lamina nesting in the pockets of the other lamina so as to leave a set of interpocket spaces for containing heat-sensitive materials H, only one such lamina being shown, i.e., lamina 23.

Five pairs of nesting pockets are provided in the probe 11, five pockets, 24 to 28, inclusive, of one lamina 23 only being shown, the said pockets being those projecting out of the up-side of the probe 11, corresponding in this respect to the pockets 4, 5 and 6 of lamina 3, FIGURES 1 and 2.

Pockets 24–28, inclusive, are arranged, however, for contact with the intermediate portion of the under side of the tongue in the vicinity of the anterior-posterior fold thereof. A notch 12 is provided in the free end of probe 11 and between end-pockets 24 and 26, said notch being shaped and proportioned to receive the fore-portion of the anterior-posterior fold. Hence, when the probe 11 is inserted under the tongue with the notch 12 embracing the fore-portion of the anterior-posterior fold, each of end-pockets 24 and 26 lies alongside the said fold in a position equivalent to that which would be taken by the bulb of a conventional clinical thermometer, and, as well, that which would be taken by the end-pocket 4 of a thermometer of the type shown in FIGURES 1, 2 and 3.

The center pocket 28 would then lie directly in front of the said fold, and remaining pockets 25 and 27 would occupy positions under the tongue in accordance with their location relative to pockets 24, 26 and 28, as such location is illustrated in FIGURE 4.

The pockets of probe 11 are preferably of the same size as those of the probe 1, whereby it results that a thermometer having the probe 11 is essentially the thermometer of FIGURES 1 and 2 provided with more pockets and having the end-portion of its probe widened just sufficient to provide the area needed by the five-pocket arrangement. Starting with the dimensions and peripheral contour of the three-pocket type of thermometer given above, an unwidened section, corresponding to the portion of probe 1 next handle 2, would remain such as indicated by the reference numeral 10, FIGURE 4. Thin, narrowed section 10 is desirable since it includes the region of tooth and lip closure on the thermometer, and the less obstruction the thermometer presents to such closure in said region, the better the seal around the thermometer where it passes into the mouth.

Comparing probe 11 with probe 1, it will be seen that the former represents the latter stretched out on its horizontal dimension to make room for more pockets of heat-sensitive material. As the modified shape is to cover a wide expanse of tongue tissue, it results that the probe 11 is about as broad as it is long, thus allowing pockets 24 through 27 to be circumferentially-located about the periphery of probe 11, and spaced from one another and from central pocket 28. In contrast to elongated probe 1, probe 11 may be said to be substantially disk-like, as its diameter does not vary significantly in any direction, except insofar as it is advisable to provide notch 12 to improve depth of immersion in lower-mouth tissue.

The probe 11 is illustrated as if it has just been exposed long enough to a high enough temperature to melt all the heat-sensitive materials it supports, hence, we illustrate in FIGURE 4 various possible types of symbols, marks and legends that might be utilized as visible indices of the state of the materials H. For example, legend-type indicia in pockets 24 and 26, such as the abbreviations F (for fever) and DR (for doctor), are provided, the former to apprise the user of the fact that a definite fever exists, the latter to indicate that enough fever exists that the user ought to consider calling in medical attention. Again, the letter N (for normal) may be utilized with a 99° F. material in pocket 28 as was the number 99 in the species shown in FIGURES 1, 2 and 3. The 96° F. point may be signaled by the appearance of a patch of colour or of some arbitrary pattern of light against dark in the pocket 27 (the crosshatching of pocket 27 indicating these types of indicia). The indices used on a given probe may be as various as indicated (including the numeric type as indicated by the number 97 in pocket 25), or more or less variegated than illustrated in FIGURE 4.

As described thus far, both of the several species of our novel thermometer are functionally equivalent other than for the greater number of indications possible with the one species thereof, hence, the considerations involved in interpreting melting point phenomena in the five-pocket species will be obvious from the discussion, spura, of such matters in connection with the species of FIGURES 1 and 2. However, we prefer the three-pocket form because it is structurally simpler, more suggestive of the conventional clinical thermometer in appearance, and substantially no less informative (from a health point of view) as to the thermal state of the subject, than the five-pocket version of FIGURE 4. For example, while the DR indication of the five-pocket species would normally be associated with an about 103° F., the kinds of use we envisage for our novel thermometer would not normally impose any need for distinguishing between what might be called a substantial fever (101+° F.) and what might be called very high fever (103+° F.).

Since the heat-sensitive materials H are hermetrically sealed into the plastic structure of the thermometer, the thermometer may be used more than once, provided that the change in state undergone by the materials H is reversible with respect to temperature, as in the case of melting-type materials such as the fatty acids. If reused, our novel thermometer, like its conventional counterpart, should be carefully cleansed and disinfected before reuse. For example, a polyvinyl chloride unit may be scrubbed in medical alcohol to cleanse and disinfect it, since polyvinyl chloride is inert with respect to alcohol. However, if the unit is allowed to stand in liquid of any sort, the pores of the plastic laminae will fill up, and liquid will migrate into the interpocket spaces and contaminate the material H, particularly if the plastic used contains a migrating plasticizer. Furthermore, if a unit is used several times, it should be discarded as unreliable on the expectation that its heat sealed area may have given way under use, or initially may have been slightly imperfect, to the extent that liquid (saliva, antiseptic, water, etc.) can get into the heat-sensitive material H. With melting-type materials, in general, contamination with water, plasticizer, etc., will change the melting point, of course.

Since, in any event, sanitation measures complicate use, it is best to discard the unit after one use, or, at least, to use it on one individual only, and not more than two or three times.

Re-use cannot occur, if the change of state of materials H is irreversible with respect to temperature. The melting type of indication can be made irreversible, if the heat-sensitive material H can be caused to dissolve some other material, and, in consequence, to change in appearance. In the case of fatty acids, oil-soluble, non-toxic dyes can be thus used. For example, starting with lamina 3, or its counterpart in the species of FIGURE 4, and layers of solidified fatty acid materials in the pockets thereof, instead of there being provided a numeral or the like on the pockets of the other lamina, lamina 13, say, a coating of dye may be laid on top of each layer of solid fatty acid material, or on the outer surfaces of the bottoms of the pockets of the lamina 13, or equivalent. While the said laminae can be heat-sealed together without raising the temperature of the materials H enough to dissolve the dye, care must be taken otherwise to maintain, as by refrigeration, the heat-sensitive materials in solid condition during assembly, shipping and storage of the thermometer until the time of use.

Before use, a thermometer of this type would have blank-appearing pockets such as illustrated in the case of pockets 4 and 5, FIGURE 1. Upon use, the contents of one or more pockets would melt and dissolve the dye, and one or more pockets would show a patch of color, which would persist even though solidification of the molten solution or solutions dye and material H occurred. Since it would be difficult to detect visually the difference between the solidified and molten states of the dyed materials H, the unit could not be used more than once, as a practical matter, and would have to be discarded. After use, the indications of such a unit persist and may be read at leisure anytime, providing that, after use, care is taken not to expose the unit to a temperature sufficient to melt the contents of any pocket that had not been melted during use.

Irreversibility of indication may also be obtained without storage problems by adopting the pocket structure shown in FIGURE 5, wherein the reference numerals 7 and 17 denote the nested pockets of a laminated heat-sealed thermometer structure basically like either of those illustrated in FIGURES 1 to 4, inclusive. However, in the species of FIGURE 5, a pointed element 15 is provided internally of pocket 7 and is arranged to project upwardly from the bottom thereof, and the bottom of pocket 17 is provided in the form of a lenticular element 18.

In addition, a third pocket 40 is provided between pockets 7 and 17, the arrangement being that the pockets 7, 17 and 40 nest together so as to divide the interpocket space between the bottoms of pockets 7 and 17 into two parts. Conveniently, pocket 40 is formed in a third lamina (not shown) of the same shape as the laminate (not shown) in which pockets 7 and 17 are formed, and having the same number of pockets as each of its fellows.

Following the principles of FIGURE 3, the interpocket space between pockets 7 and 40 has therein a quantity of heat-sensitive material of the melting type, preferably a fatty acid mixture such as described, supra. The interpocket space between pockets 17 and 40 has a fibrous absorbent mass of material therein, such as filter paper 16 substantially covering the bottom of pocket 40, and there being a deposit (not shown) of oil-soluble dye between said material and the inner surface of the bottom of pocket 40, said material contrasting in color to said dye.

The entire assembly, as thus far described, is heat sealed together so that the tri-laminar structure around the periphery of the set of nested pockets welded together, thereby to hermetically confine the contents of each interpocket space.

Supposing a thermometer to be made up utilizing the pocket structure of FIGURE 5, it could be provided with numerals concealed and revealed by solid/liquid phase transformations in the material H, assuming pocket 17 and its fellows to be transparent, to provide a device usable exactly as the units shown in FIGURES 1 to 4, inclusive.

However, in addition, irreversibility of indication may be provided by for making at least the lenticular portion of pocket 18 sufficiently translucent as to make visible therethrough color contrasts such as exist between dye and filter paper 16, and allowing communication between said paper and the said dye, on the one hand, and material H, on the other hand. Accordingly, immediately before use of a thermometer utilizing pocket structure according to FIGURE 5, each set of nesting pockets, e.g., pockets 7, 17 and 40 are squeezed together so as to cause point 15 to rupture or pierce the bottom of pocket 40. The thermometer is then placed in the mouth, pocket 40 up, whereby, if material H melts, it will exude through the break in the bottom of pocket 40 and be absorbed in the dye and filter paper. As a result, the paper 16 will become at least partly suffused by a solution of dye and material H, an event the occurrence or non-occurrence of which will be detected by inspection of the bottom of pocket 17 via lenticular element 18. Once the material H has bled into the dye and absorbent material, the capacity of indication of the unit has been at least partly destroyed. (Obviously, if the user is so determined, he can attempt to re-use the unit for the sake of any un-activated pockets remaining after prior use.) As a practical matter, however, the thermometer indicates irreversibly and is not re-usable.

As for the nature and quantity of material used and the proportions of the structural elements of FIGURE 5, these preferably are identical, insofar as possible, to those utilized in the units of FIGURES 1 to 4. In addition, it is convenient to make the bottom of pocket 40 of somewhat thin material so that it is easily pierced, and to form the lenticular portion 18 in pocket 17 to provide a somewhat thick element. By thin and thick, of course, we mean relative to the overall gauge of the lamina 7 and 17.

In this way, when the pockets are squeezed together to prepare the unit for use, piercing of pocket 40 is assured, and the possibility of piercing pocket 17 at the same time is prevented.

While the drawing indicates pointed elements 15 as formed integrally with pocket 7, said element may be formed separately and secured to the pocket bottom, or it may be in the form of thumb-tack, more or less, resting upside down on its head on the bottom of pocket 7. Again, while it is convenient to provide all the pockets as those of pocketed laminate of heat-sealable plastic, pocket 40 could be replaced by a thin, disc of glass, or other impervious but rupturable material, hermetically closing pocket 7, whereby to obviate the need for a third lamina containing pockets (like pocket 40) as frangible separator elements.

FIGURES 6, 7 and 8 illustrate yet another mode of realizing irreversibility of indication in a thermometer according to our invention. In FIGURE 6, reference numeral 41 denotes the probe portion of a thermometer unit of the shape illustrated in FIGURE 1, said unit being made of correspondingly shaped laminate 34 and 35, having pockets 20, 21, 22, 30, 31 and 32 (see FIGURES 7 and 8) formed therein. Unlike the unit of FIGURE 1, the laminae 34 and 35 are sealed together only around the periphery of probe 41, as at 37, and the said pockets do not nest. Instead, pockets 20, 21 and 22 are paired off, and register respectively with pockets 30, 31 and 32 each pocket in each pair of registering pockets opening toward its fellow.

Between the laminae 34 and 35 is provided a slide 9 having a pair of apertures 19 and 29 therein, the slide 9 snugly but slidably fitting between the unsealed portions of laminae 34 and 35. As indicated in dashed line in FIGURE 6, it will be seen that slide 9 has the same contour as the probe parts of laminae 34 and 35, but that the lateral edges of probe 41 are parallel to the lateral edges of slide 9, and that probe and slide each have a circular terminal contour parallel to that of the other. Thus, as is evident from FIGURE 7, if the peripheries of laminae 34 and 35 are heat-sealed to one another around the periphery of a slide 9 positioned between said laminae, just far enough away from the slide to avoid involving portions of it in the seal, the slide is snugly embedded in a space of like shape and proportions. As a result, the slide 9 is firmly frictionally held in place between the laminae but, nevertheless, may be slid out of such space.

In constructing the thermometer of FIGURES 6, 7 and 8 prior to the above-described assembly step, the pockets 30, 31 and 32 would be provided with fillings of heat-sensitive materials H, and each of pockets 20, 21 and 22 would each be provided with a suitable insert 36 of absorbent material and soluble dye as in the case of the species of FIGURE 5. Then, after placing slide 9 between the laminae 34 and 35 with its peripheral contour parallel to that of the probe portions of laminae 34 and 35, and wtih holes 19 and 29 of slide 9 falling between adjacent pockets (as shown in FIGURE 6), the sealing step supra, would be carried out with a pair of heated dies that would press the peripheries of laminae 34 and 35 together about the contour of slide 9. The resulting unit would be like the species utilizing the pocket structure of FIGURE 5, in that the slide 9 would form a barrier between heat-sensitive materials H and inserts 36.

To prepare the thermometer for use, the slide 9 would be pulled out until its apertures 19 and 29 lay between pockets 21 and 22 respectively, on the one hand, and pockets 31 and 32 respectively, on the other hand. This position is illustrated in FIGURE 7 where it is seen that pockets 21 and 31 communicate with each other via aperture 19 (pockets 20 and 30 will then communicate also since the tip of slide 9 will now fall short of obscuring the space between pockets 20 and 30). Accordingly, when the thermometer, thus prepared, is put into use, pockets 30, 31 and 32 projecting up and being under the tongue, any material H that melts will escape into one or more of pockets 20, 21 and 22 and suffuse one or more inserts 36 with the dye color.

Thus, the thermometer of FIGURES 6, 7 and 8 functions as does one utilizing the constuction of FIGURE 5, except in the manner of preparing (just before use) the instrument for irreversible indication.

Preferably the dimensions, materials, etc. are those recommended for the device of FIGURE 1, although the probe 41, of course, will then be a fraction of an inch wider and a trifle thicker overall than the probe 1. In addition, it is advisable to coat the slide 9 with a material that neither wets nor contaminates the materials H, since such coating will effectively prevent creeping of molten material H from one pocket to another. In the case of fatty acid materials, a Teflon coating will perform such service. Hence, the material H cannot escape pockets 30, 31 and 32 until escape is provided for by moving slide 9 and, as a result, the dye of the inserts 36 cannot be activated until it is desired to do so.

Slide 9 may be entirely sealed in between (but not sealed to) the laminae 34 and 35, so as to make it necessary to cut into the handle (not shown, but which would be identical to that shown in FIGURE 1) of the unit to get at the slide 9. While in some respects, such procedure is undesirable, the sealed construction necessitating cutting open the handle assures that the contents of the unit will not be contaminated from the exterior during storage, discourages tampering, and favors disposal of the unit after one use. On the other hand, the slide may be made sufficiently long to project externally from between the extremities of the handle portions of laminae 34 and 35, which place therefore would be left unsealed.

Of the several species of thermometers described supra, the irreversibly-indicating types are not as precise as the reversibly-indicating types, for the reason that the irreversibility factor obscures the events occurring during the process of melting. For example, if, upon use, a unit utilizing the pocket structure of FIGURE 5 reveals a partial-dyeing of the visible area of the absorbent element 40, such effect cannot with certainty be ascribed to partial melting only of material H. On the other hand, the material H is not relied on to obscure a symbol, and a relatively minute quantity thereof suffices to produce a visible staining action in the absorbent element 40. Hence, a layer of material H several times thinner than 0.03 inch may be utilized and, as a result, both speed and sharpness of response will be improved, relative to the behavior in such respect of a reversibly-indicating unit wherein sufficient material H must be provided to obscure a symbol until sufficient melting occurs.

The illustrations suggest that the thermometer pockets are relatively precisely made and fitted, and this is the case. One consideration, apparent from FIGURE 3, is to locate the fatty acid material a little removed from where the heat involved in sealing is generated. Again, in the nature of things, the plastic lamina surfaces to be fused together must be very clean for a good seal, but molten fatty acids creep. Furthermore, molten fatty acids contract when they solidify. Hence, if the fatty acids are put into the pockets in molten form, or if they melt while sealing is going on, trouble may be experienced with leaky seals and/or large air bubbles in the interpocket spaces. Finally, since what we have disclosed as to use and function of our novel temperature indicator is dependent, for best results, on having the interpocket spaces substantially filled with heat-sensitive material H in a layer of specified depth, leaks and voids or air bubbles are to be avoided. We find, however, that if the fatty acid material is dispensed into the pockets of lamina 3 in compacted form of the exact amount needed to fill the interpocket space that will exist after assembly and sealing, and the sealing is performed by compressing the laminae between die-like electrodes from the operative elements of a dielectric-type heating means, no melting of the fatty acid material can be detected and, in any event, good sealing and well-filled interpocket spaces consistently result that, in cross-section correspond closely to FIGURE 3. Overfilling must also be avoided, else the pockets will not nest tightly enough together to permit proper sealing and/or a stress-free pocket construction to result.

Sealing may be practiced with adhesives, but it must be remembered that contamination of the heat-sensitive material may result. However, the use of a non-setting adhesive lends itself to the possibility of simply covering the partly-filled pockets of a single lamina, say, lamina 3, with a cover adhesively secured over the pockets. A fugitive-element type of indication, nonreversible, is thus made possible, since, if the said cover is peeled off, and the thermometer put in the mouth, the materials H that melt, if any, will be washed or spilled out into the mouth, while those that remain solid, if any, will remain. Inspection of the used unit will therefore reveal that the temperature attained was as great or greater than the melting point of any pocket-contents that disappeared, and less than the melting point of any material that remains in its pocket or pockets. This variation is of limited utility, however, since though the fatty acids (except acetic and formic) are quite harmless, few people will tolerate their taste.

The sealed units have no taste problems, of course, but with these, the sense of taste may be utilized to good purpose by coating the probe-part of the instrument with candy or with hardened and flavored gelatin (artificial sweeteners, rather than sugar ought to be used in any such preparation, in contemplation of use by diabetics). The edible coating will not only act as an inducement for a person, particularly a child, to keep the object in the mouth for the time required, but, in addition, will cause copious salivation and assure that the thermometer probe is totaly immersed in tissue and liquid for optimum heat transfer. Preferably, the weight of the coating is adjusted so that it takes about three minutes to consume it entirely or to the extent that a noticeable change in taste is sensed.

While the coating may induce the user to use the unit as a lollipop (the species of FIGURE 4 is even strongly suggestive, in shape, of a lollipop), this is not necessarily fatal to acceptable results, provided the user sucks strongly on the probe so as to compress it tightly between roof of mouth and top of tongue, and refrains from breathing through the mouth. Tests along these lines indicate that consistent but lower-than-under-tongue results are readily obtained with our novel thermometer, even though other instruments, such as bare-junction thermocouple instruments and conventional mercury-in-glass thermometers, give erratic results if used with junction or bulb compressed between roof of mouth and tongue.

It appears that if the novel thermometer is positioned with pockets 4, 5 and 6 embedded in the top of the tongue and the probe is sucked on strongly, the heat-sensitive material H is in good thermal contact with the tongue and its blood supply, air volume of the mouth is at a minimum, the dependency of the pockets isolates the material H from what is though to be the cooling influence of the roof of the mouth, and, at the same time, practically no intra-oral part of the unit is exposed to what little air remains in the mouth. Therefore, one would expect, heat transfer relations will be about optimum for oral temperature measurement purposes, except for the gradient between the blood in the inferior process of the tongue and the blood at the top of the blade of the tongue. As a result, with a given subject, a top-of-tongue measurement will be lower than undertongue measurements, but consistent. Top-of-tongue temperature cannot be recommended, of course, for it is not a scientifically or medically accepted convention. However, we find it to be reliable, subject to the limitations expressed above, and provided it be not equated to oral temperature measured under the tongue.

In any event, a pocket-bottom-up, under-the-tongue position, well back in the mouth, for the probe end of the thermometer is preferred, as indicated by the instructions illustrated on handleportion 2, FIGURE 1.

It will be seen from the foregoing that each of the disclosed specific embodiments of our invention relies on the phenomena involved in the physical transformation of a material between solid and liquid, and in particular, on these phenomena as exhibited by mixtures of saturated fatty acids. While there is a large number of materials exhibiting various types of physical and/or chemical transformations, reversible and irreversible, as a function of temperature, nevertheless, considerations such as stability, reproducibility and toxicity, for our purposes, are best suited by mixtures of the saturated fatty acids derived from natural sources in commercially pure form (and readily available cheaply, in large quantities).

The usefulness of these mixtures can be laid to the phase characteristics of the imperfect-eutectic-type phase systems formed by said mixtures. In the lauric acid/myristic acid system, for example, if the proportions of the mixture are varied from all myristic and no lauric to all lauric and no myristic, and, at the same time, the solidus/liquidus variation of the system with respect to temperature is examined, it is found that solidus and liquidus temperatures fall steadily from maximum values at the extremes of mixture proportions until the proportions of the mixture reach values in which stable solid compound formation occurs in the transformation process between solid and liquid. This region is bounded on both ends by sharp changes in direction in the solidus-liquidus curves, which merge substantially at the so-called eutectic and peritectic points. Between the said points, the solidus and liquidus curves diverge again so that an elongated area is defined by solidus and liquidus curves between said points, the proportions of such area indicating the extent of stable solid compound formation.

It appears that shapness of melting point is a function of the difference between the solidus and liquidus temperatures of a given mixture. In this case, such difference, for certain mixture proportions in the region of stable solid compound formation is small enough that the melting point of said mixture is as sharp as we desire and also stable. In the table, supra, all the mixtures therein, when mixed by weight in the proportions given, are of this type.

The possible phase diagrams for binary systems exhibiting one or more eutectic-like phenomena range from that in which complete, stable solid compound formation occurs to that in which no stable solid compound formation occurs. For the even-series of saturated fatty acids, the phase diagrams for various binary mixtures thereof can be predicted on the basis of the relative molecular weights of the components of such mixtures. For example, taking next-adjacent pairs of even acids, e.g., lauric and myristic acids, one finds that the corresponding phase system has limited stable solid compound formation, a peritectic point and a eutectic point, said points occurring at different relative proportions of the mixture, but close to the same temperature, due to the facts that the difference in molecular weight of the constituents of the mixture is small relative to the average molecular weight of the mixture, and that the saturated even acids, though polymorphic, revert to the same form during liquid-solid transformation by temperature change.

The phase diagram of FIGURE 10 is typical of binary systems of next adjacent even series saturated fatty acids, in particular of lauric-myristic systems, the horizontal axis of the diagram reading increasing concentration of myristic from left to right, and the vertical axis reading increasing temperature from horizontal ais upward. The diagram, however, is not more than approximately proportioned in accordance with the mixtures disclosed herein, however, nor is the realization of such mitures dependent on ascertaining a phase diagram therefor. FIGURE 10 nevertheless illustrates the point that between the points $p$ and $q$ the region between liquidus and solidus is defined by a relatively narrow band (area C) where solid compound exists in contact with liquid.

Thus, the area A, B and C separate the solid state from the liquid state, i.e., mixture whose temperature and composition is given by the coordinates of a point above the said areas are totally liquefied, whereas a mixture whose temperature and composition is given by a point below said areas is totally solidified. Areas A and B define solid solutions in equilibrium with liquid, whereas area C defines solid compound in equilibrium with liquid. It will be observed that at points $p$ and $q$, the upper bound of area C in its dashed line continuation goes into an area D and into and through area B, just skirting an area E, at its respective ends. Areas D and E are solid solution in equilibrium with solid compound. The space F defines solid compound with dissolved solid of one component. Point $p$ is the eutectic and $q$ may be termed the peritectic. As compared to areas A and B, melting/solidification transition is sharp in area C for, as compared to A and B, the vertical widths of area C are small. The region of limited stable compound formation corresponds to area C. It is to be noted that the solid-line elements of FIGURE 10 are such as would result from direct observation of solidification and liquefaction. However, the dashed line elements define boundaries such as might be inferred from the solid-line elements.

Since an even saturated fatty acid, when prepared "commercially pure," contains as impurities substantially only the next adjacent members of its series by molecular weight, mixtures of commercially pure constituents conform closely to the phase behavior that would be expected to mitures of really pure acids, even though it is to be expected that "commercial purity," in terms of actual purity, may vary appreciably from batch to batch, from manufacturer to manufacturer, and so on. For example, lauric acid and myristic acid are next adjacent, even-series, fatty acids, hence, a commercially pure quantity of lauric acid will be contaminated with capric acid and myristic acid and a quantity of commercially pure myristic acid will be contaminated with lauric acid and palmitic acid. Accordingly, a miture of commercially pure lauric acid and commercially pure myristic acid will have very nearly the same average molecular weight as a mixture of their truly pure forms.

Likewise, in the ternary mitures given in the table, supra, the same situation will hold since commercially pure palmitic acid is "contaminated" with stearic acid and myristic acid.

While it is no doubt true that the "contaminants" of the commercially pure forms of the saturated, fatty acids have a slight quantitative effect on phase systems, deleterious qualitative effects on phase systems are neither expected nor observed.

In any event, we have found that, in compounding mixtures once found to be suitable, batch after batch thereof can be reproduced without more control than to assure that the nominal proportions of the several constituents be provided, even though materials of only "commercial" purity are used eclusively. In fact, we also find that slight changes in the melting point (on the order of one-half a Fahrenheit degree) can be made by adjusting the nominal proportions slightly, without affecting melting sharpness.

The solution to the practical problem of locating a suitable set of proportions for binary fatty acid mixtures is obvious from what has been said, supra. The situation with regard to ternary mixtures is more complex, but we have discovered what appears to be a straightforward, simple way of selecting the proper proportions of ternary mixtures—for instance, those set out in the table, supra, were thus determined, in effect.

FIGURE 9 illustrates the principles involved in ternary phase systems, and is in the form of the well-known Roozeboom diagram—an equilateral triangle, the geometrical characteristics of which may be used to map the interior of the triangle in terms of the isotherms of a ternary phase system. In this case, the triangle gives the isotherms of the system palmitic acid, myristic acid, and lauric acid, a fact indicated by the designations $C_{12}$, $C_{14}$, and $C_{16}$ at the vertices of the triangle ($C_{12}$, $C_{14}$ and $C_{16}$ are chemical colloquialisms for lauric, myristic and palmitic acids, respectively).

Every point within the triangle stands for a unique set of proportions of the ternary system, none of which is zero. Each point on a side of the triangle divides that side into two parts, each part of which corresponds to a percentage of a single component in a mixture wherein one of three components associated with the vertices of the triangle, namely, that component associated with the vertex opposite the said side, is lacking. Each vertex stands for 100% of the component associated with that vertex. (This particular diagram, incidentally, is laid off in terms of molar composition.)

If the melting (or solidfication) points of a sufficient number of ternary mixtures are known (and, of course, the proportions of each mixture), one finds that there are pluralities of mixtures in each of which, each mixture has a different percentage composition than its fellow, and each of which has the same melting (or solidification) point. Each such plurality therefore defines an isotherm which may be mapped as shown in FIGURE 9 in the form of a set of contours radiating outwardly from a point which identifies the eutectic composition for the ternary system.

Unlike the usual triangle diagram, the diagram of FIGURE 9 is marked with a cross-hatched area Z. The points within a region approximately indicated by area Z correspond to those ternary mixtures of such percentage composition as to fall in the region of stable solid compound formation, that is in a region of percentage compositions such that solidus and liquidus curves lie very close together, as in the region between peritectic and eutectic in the case of binary systems.

The approximate bounds of the area Z are readily located by inspection of the diagram to determine where isotherms make a substantial net change in direction and begin to extend in about the same direction as one side of the triangle. It will be seen that the isotherms in FIGURE 9 behave in such manner with respect to the $C_{16}$–$C_{14}$ side.

It will be observed that those parts of the isotherms defining the area Z are between the $C_{16}$–$C_{14}$ side and the lowest value isotherm (substantially a point on or near the line X about ⅓ the way out from the $C_{12}$ vertex). Unless the above-referred to direction and change in direction characteristics do locate the area Z between the lowest value isotherm and the side with respect to which the directional properties of the isotherm are judged, compositions in such area cannot be expected to have stable, sharp-melting tendencies.

Having located the area Z, a straight line X is drawn from vertex $C_{12}$ through about the middle of area Z to the side $C_{16}$–$C_{14}$. Wherever an isotherm intercepts line X, a ternary mixture is determined having a melting (or solidification) point corresponding to the intercepting isotherm.

Accordingly, we may go along the line X until we come to an isotherm intercept thereon corresponding to temperature required to be indicated by our novel thermometer. The part of line X between said isotherm intercept and the vertex $C_{12}$ represents a certain amount of lauric acid, and the part of line X between said isotherm intercept and the $C_{12}$–$C_{14}$ side of the triangle represents a certain amount of the 60/40 mixture of myristic and palmitic acids, and, if the palmitic acid/myristic acid mixture and lauric acid are added together in proportion to such amounts, a ternary mixture results having the desired melting (or solidification) point.

In practice, knowing a few isotherms as indicated in FIGURE 9, the desired isotherm intercept in line X is determined approximately by interpolation. The percentage composition thus determined is made up, tested and adjusted, if need be, to get as close as desired to the desired isotherm. Insofar as we can determine, the only critical step in selecting the proper percentage composition is finding the general location of area Z. In fact, while our view of these matters is oriented by melting points, we have used a published diagram of solidification point isotherms to locate ternary mixtures melting sharply and stably at desired temperatures. Naturally, it is to be expected that published data is determined in part by the experimental technique and materials—purity used, so that percentage compositions determined from such data may be expected to be approximately only. Nevertheless, it results that adjusting the approximate percentage composition, routinely and readily leads to a percentage composition having a sufficiently sharp and stable melting point at the desired temperature. It appears that while the isotherms of a given diagram may be off to an extent reflecting lack of material-purity and/or peculiarities of experimental technique, the region X of the diagram nevertheless locates the region of stability and sharpness of melting point clearly enough for our purposes, even if the materials used in establishing a given diagram differ substantially in purity from the materials used in preparing mixtures from the data given on the diagram. This circumstance is very convenient for it obviates any necessity of tediously establishing hundreds of melting (or solidification) points on the slight chance of finding a suitable sharply and stably melting mixture.

It will be noted that, as to all the ternary mixtures determined by line X, the ratio of palmitic acid to myristic acid is a constant given by the intercept of line X on the side $C_{16}$–$C_{14}$. Hence, the process of selection amounts to choosing a given quantity, say, about a 40/60 mixture of palmitic and myristic acids, and adding varying quantities of lauric acid to said given quantity so as to define various ternary mixtures corresponding to points on line X. Insofar as we can determine, one can start from nearly any binary mixture of proportions between peritectic and eutectic (i.e., the range on side $C_{16}$–$C_{14}$ covered by shaded area Z). Moreover, though it is obvious that not more than a few of such binary mixtures can be of the requisite stability, say, one-half of a Fahrenheit degree, it appears that the stability of ternary mixtures is not dependent on the stability of its binary component, but is rather dependent on to whether or not percentage composition of the binary component, by itself, falls between the eutectic and peritectic for the binary system. In other words, stability and sharpness of melting point may be expected of compositions in area Z.

From our work with binary and ternary components and from relevant literature on the subject of phase systems of the even-series, saturated fatty acids, we believe that it is evident that phase systems of more than three components would also be suitable for the purposes discussed herein. This conclusion is supported by the fact that what we have termed a ternary system is really a quinary system, because our work has been performed using mixtures of commercially pure acids. Therefore, the ternary mixtures in the table, supra, actually contain a few percent of capric and stearic acids as well as lauric, myristic and palmitic acids. Consequently, we believe that our invention, in terms of the heat-sensitive material H, is not restricted to the binary and ternary systems disclosed herein, but covers mixtures consisting of any number of adjacent members of the even-series of saturated fatty acids.

Because of our particular interest in human temperature, our disclosure is in terms of a few of the lower members of the even-series of saturated fatty acids. Since the lower one goes in this series, the more active the acids become (e.g., the lowest is acetic acid), it is to be expected that as one goes up in the series, above the acids we have discussed, behavior along the lines disclosed herein will become more and more regular. Hence, it is certain that, where higher ranges of temperature measurement are involved, higher melting even-series, saturated fatty acids—stearic and so on—can be applied as taught herein as to lauric, myristic and palmitic acids. Accordingly, we believe our invention to cover substantially any combination of adjacent, even-series of fatty acids.

The matter of human temperature measurement also imposes a standard of stability and sharpness of melting point, such that reliability of measurement is one-half of a degree Fahrenheit or better. Outside the realm of pure substances and eutectic compositions, such reliability is unprecedented and, insofar as we known, only the use of mixtures of adjacent, members of the even-series of saturated, fatty acids allows of producing a thermometer suitable for diagnostic use, as described before, without burdening the user with a need for giving special treatment to the thermometer such as controlled storage or conditioning before use. However, we have found that many saturated fatty acid mixtures would suit the stringent requirements we have established for our novel thermometer (because of its diagnostic application), provided that the instrument be not exposed to unsuitable conditions prior to use, or, if thus exposed, that it be conditioned immediately before use to avoid the effect of such exposure.

For example, we intend that the ordinary user use our novel thermometer about exactly as its conventional counterpart, (to the extent indicated by the instructions on handle 1, FIGURE 1). However, if a conditioning routine be introduced in the use of our novel thermometer, saturated fatty acid mixtures, other than those indicated in the table and, in some respects, having undesirable phase characteristics, may be used. In a typical case, a mixture of 40% palmitic acid and 60% lauric acid, which normally melts to transparency by 100.9° F., may melt to transparency a Fahrenheit degree off, if first allowed to crystallize very slowly from a molten state. If, however, a unit is made using this mixture, and immediately before use the unit is warmed to the extent of completely melting said mixture, then cooled five or six degrees or more (as by running cool tap water on the unit) so as to recrystallize said mixture, the next time said mixture melts it will reach transparency as close to 101° F. as would the corresponding ternary mixture listed in the table, supra. Again, such precautionary conditioning permits using the 54% myristic–46% lauric mixture for a 98.6° indication, or a 20% palmitic–80% lauric mixture for a 97° point. In fact, conditioning permits using myristic-lauric mixtures containing from 30% to 58% myristic acid to indicate, with half-degree precision and reliability, temperatures in the range from 94° F. to about 101.5° F., even though some of these binary mixtures (and the above-noted 20/80 palmitic-lauric mixture) have percentage compositions outside the range from eutectic to peritectic.

In general, tests of binary mixtures of commercially pure even-series acids from capric to stearic show that, with conditioning and subject to decreasing sharpness of phase changes about in proportion to molecular weight difference between mixture components, stability and precision of indications is obtainable with such mixtures to a half of a degree Fahrenheit, or better.

Again, the even-series, saturated fatty acids, are paralleled by the odd-series, saturated fatty acids. While the melting points of the individual odd-series acids are not quite as sharp as those of the even-series acids, mixtures of the odd-series could certainly be utilized far more satisfactorily than materials that have been proposed so far in the prior art for the purpose of temperature measurement. From our point of view, the main drawback with the odd-series acids is that they are not readily available.

Even-series acids are of wide commercial and industrial use and their sources are natural fats and oils. Therefore, numerous even-series acids are cheaply and readily obtained in large quantities. The odd-series acids, for the most part, are little used outside of experiment and, with a couple of exceptions, must be synthesized, rather than prepared directly from natural lipoids.

Finally, our specific examples are given in terms of commercially pure (about 95% pure, for example) materials. Purer materials would possibly give improved results, but it is unlikely that the improvement would justify the cost (at present prices) of higher purity. In any event, the degree of purity is not significant here in view of the fact that the contaminants are also saturated fatty acids. It goes almost without saying, however, that contaminants of greatly different chemical and/or physical characteristics are to be avoided, as for example, plasticizers, water, unsaturated fatty acids and so on.

The concepts implied by the terms phase systems, liquidus, eutectic, peritectic, compound formation, and so on, are well-known in the art, and, therefore we need not dwell here on the theory behind the terms. Nevertheless, our discussion of phase behavior, and so forth, provides a theory which both explains our results and is a practical, useful guide in determining suitable heat-sensitive mixtures. However, the important thing is our discovery that mixtures of saturated fatty acids exhibit sharp, observable and stable melting processes and are singularly useful, both from the point of view of having to measure a number of low temperatures in a very restricted range, and from the point of view of having to perform such measurement using non-toxic, readily available, cheap, and easily-handled materials.

Whatever the true theory may be, our experience with binary and ternary phase systems of saturated fatty acids, assures that mixtures of such acids can be expected to be derived on the basis merely of selecting and testing mixtures of proportions intermediate eutectic and peritectic proportions. Further, the less restricted the requirements of stability and precision, the more plentiful will be the number of acceptable saturated, fatty acid mixtures that will still be superior in such respects than prior art state-changing concoctions or materials known to us as used to measure temperature as a function of change in state.

Thus far, we have discussed the utility and advantages of our novel thermometer mainly from the point of view of home use by the layman. It is easy to see from what we have said, as to what sort of health information one may expect to derive from an oral temperature measurement, that our novel thermometer will have its applications in the doctor's office, and in clinic and hospital, say, as a routine screening and checking device, for the sake of the fact that its disposability obviates possibilities of contagion and need for disinfection after its use, or because in plastic, or like form, it is substantially unbreakable. In particular, children's wards, epileptic wards, and contagious wards are places where factors such as fragility and contamination are especially relevant in the matter of choosing an instrument for temperature measurement therein.

In the case of hospitals, generally, our novel thermometer would be of value, if only as a screening device, since in many cases quite inexperienced persons, even many of the patients themselves, could be entrusted with the taking of temperatures. Such practice would permit trained personnel such as nurses to limit their services in the matter of temperature taking with the usual clinical thermometer to such cases as require precise temperature determination for various reasons, one of which might be indication of fever as given by a thermometer according to the invention.

Cleanliness and sterility are crucial factors in institutional use of thermometers but, in practice, the conventional glass thermometer is likely to be less than ideally clean and/or sterile. However, our novel thermometer, once packaged in a sealed envelope made of cellophane, or like material, may be made absolutely sterile by well known practices involving treating the envelope with an external application of ethylene oxide gas, which leaves the interior of the envelope and the external surface of the thermometer inside absolutely sterile until the envelope is opened for use of the thermometer unit.

Obviously, therefore, use of our novel thermometer would be of value in hospitals to the extent that it would eliminate time and effort spent on shaking down and sterilizing thermometers. The benefit involved could be substantial, as is evident from the fact that some hospitals assign each patient his own thermometer in order to avoid having to follow absolutely reliable disinfection practices.

There are also use-environments, to which our novel thermometer is uniquely suited. For example, the mercury-in-glass thermometer is a hazard in nuclear installations because mercury contaminates so-called atomic piles. In particular, no mercury thermometers are allowed on atomic submarines. Our thermometer presents no such hazard.

Again, such institutions as the armed forces, wherein more or less routine checks of temperature may be carried out on large groups of usually healthy individuals possibly under practically no supervision, or under supervision of personnel with limited or no medical training, and often in primitive or unusual circumstances, would benefit by the use of our novel thermometer as a reliable, easy to use, rough and ready screening instrument that can be a part of the equipment of an individual to be used by him when and where needed, and the loss of which would be of no great moment as to the matter of cost. Likewise, our novel thermometer would make a useful, compact addition to the so-called "survival kits" with which individuals, vehicles and groups are often furnished for emergency use. On the other hand, cost and fragility alone bar extensive application of the conventional clinical thermometer in situations such as these.

Mass disaster such as holocaust, epidemic and the like is an occasion in which use of our novel thermometer is uniquely appropriate for the reason that disaster may be expected to be characterized by the lack of facilities, trained personnel and instruments required for taking victims' temperatures according to conventional practice. In short, in disaster situations there are often too few conventional thermometers, too few people who know how to use them properly, and inadequate means for disinfecting used thermometers. Moreover, the conventional clinical thermometer is a hand production item and an expensive one to stock in large quantities.

While it will not often be found that large quantities of conventional thermometers are available on short notice for emergency use, even from the prime source of supply, on the other hand, our novel thermometer is cheap enough to stock in large quantities, and is manufacturable in large quantities on short notice.

Therefore, it would often be practicable and desirable to stock thermometers according to the invention as standard items for use in emergency, whereby medical personnel and conventional clinical thermometers would be reserved for attending to those in actual need, which need would be determined, in part at least, by a screening process wherein thermometers according to the invention would be applied en mass by the lay personnel (or, perhaps, by many of the victims themselves) that normally make up most of the human force of assistance in disasters.

While loss, theft and breakage are often pressing problems encountered in large-scale use of conventional mercury-in-glass thermometers, e.g., during disasters, in institutions, and so on, use of the sturdy and inexpensive thermometer according to our invention would greatly reduce or even eliminate such problems.

Finally, our invention has also an aspect of general utility in the matter of determining relatively low temperatures. For example, the use and/or preparation of bathwater, foods (especially infant nutrients), incubators, and the like, is facilitated if there is available an inexpensive, reliable and easy to use temperature measuring instrument for use in such situations.

It is clear from the foregoing that the gross structure of a thermometer according to the invention, e.g., the various laminae, more or less inevitably leads to the choice of plastic structural elements. In a senses, this is an inherent consequence of the fact that, unlike the mercury-in-glass clinical thermometer, the gross structure of our novel thermometer merely contains the indicating elements, viz., heat-sensitive materials H, and plays no direct part in determining the thermal response of materials H beyond somehow permitting the said thermal response to be observed. Hence, as convenient as it may be to utilize plastic laminae, as described, supra, nevertheless, materials other than plastic may be used. For example, metal, glass and paper are obvious possibilities in selecting materials from which the laminae are to be made entirely or partially. Each of such materials has well-known chemical and physical properties which must be taken account of in considering such matters as assembling the device, providing for inspection of the materials H, response time and so on. Hence, while unplasticized polyvinyl chloride plastic is peculiarly suitable for use in heat-sealed units utilizing fatty acids as materials H, we do not believe that use of materials other than the polyvinyl chloride plastic would be outside the scope of our invention.

Likewise, we also believe it to be within the spirit of our invention to utilize state-changing materials other than the particular materials H disclosed. Substitutions of this sort, in the case of human thermometry, would be subject to the principles described hereinabove and given other materials having suitable change-of-state temperatures, it would be mere routine for one skilled in the art to utilize such materials in accordance with our invention.

It is highly significant to note that the art of human temperature measurement has been dominated since the beginning of the art of temperature measurement (and without serious challenge) by liquid-in-glass-tube instruments. This is probably due to the fact that, once the fragility and reading difficulty of glass-tube instruments are accepted, no other thermometric device is as simple, easily maintained, foolproof, and stable, as to both structure and operation, and at the same time relatively inexpensive to manufacture.

The foregoing, however, is relative to other thermometric devices that have been now and then applied to the art of human tempertaure measurement as, for example, bimetallic instruments (occasionally proposed in a form suitable for human temperature measure in place of the glass clinical thermometer), or, thermocouple and other electrical devices (having properties of continuous measurement—useful occasionally in laboratory, or like investigation of human temperature).

Our novel thermometer, viewed in the light of the foregoing, is a considerable advance in the art, for the reason that, not only does it possess those qualifications of its conventional counterpart that enable the latter to dominate the art of human temperature measure, but it is also non-fragile and easy to read. Moreover, it also improves on the conventional thermometer on the score of maintenance and expense. Add to this the fact that we have also discovered heat-sensitive materials such as to permit our novel thermometer to rival in accuracy the conventional mercury-in-glass clinical thermometer, and it is obvious that our invention is in outstanding advance in the art. Summing up, for the first time in several centuries of human temperature measurement, the glass instrument has a competitor that substantially equals it on all counts, and betters it on many of those counts.

Though we have described our invention in great detail, for the purpose of complying with 35 USC 112, nevertheless, it is obvious that there may be variations in materials, proportions, etc., that would remain within the spirit of our invention. We, therefore, desire that our detailed description be taken as illustrative rather than as restrictive.

We claim:

1. A temperature indicator comprising a probe, said probe being proportioned and shaped for insertion in a living being, a plurality of bodies supported by said probe, each of said bodies being sensitive to temperature to indicate by a change in its appearance that it has attained a predetermined temperature and each of said bodies so responding to a temperature different from that to which any other of said bodies so responds, but each such temperature being within a range of clinical significance, and each of said bodies consisting of a mixture of saturated fatty acids.

2. The invention of claim 1, wherein each said mixture consists of adjacent members of the even-series of saturated fatty acids.

3. The invention of claim 1, wherein each said mixture is selected from the group consisting of mixtures of myristic and lauric acids, and of mixtures of palmitic, myristic and lauric acids.

4. A temperature indicator comprising a probe, said probe being proportioned and shaped for insertion in a living being, a body of heat-sensitive material, said material being of the type adapted to undergo a change at a predetermined temperature, said predetermined temperature lying within the range of clinically-significant temperature, said body being substantially permanently entirely located on said probe, and said body being so arranged as to produce a visible effect upon occurrence of said change, and said body consists of a mixture of saturated fatty acids.

5. The invention of claim 4, wherein said mixture consists of adjacent members of the even-series of saturated fatty acids.

6. The invention of claim 4, wherein said mixture is selected from the group consisting of mixtures of myristic and lauric acids, and of mixtures of palmitic, myristic and lauric acids.

7. A temperature indicator comprising a probe, said probe being proportioned and shaped for insertion in the oral cavity of a living being; a body of heat-sensitive material, said material being of the type adapted to undergo a change of state at a predetermined temperature, said predetermined temperature lying within the range of clinically-significant temperature; said body being substantially permanently located on said probe and being so arranged as to produce a visible effect upon occurrence of said change; said temperature indicator also including a handle and a connecting portion, said handle and said probe being connected together by said connecting portion, and the whole being of such length that said connecting portion lies between the lips and adjacent mouthparts if said probe is positioned in the human mouth adjacent the posterior fold of the tongue, said connecting portion being thin over such part of its length as to provide tightness and substantial completeness of mouth parts closure when said probe is in place orally.

8. A temperature indicator comprising a composition of matter and a carrier constructed and arranged for supporting said composition of matter in heat transfer relation with an entity of which the temperature is to be measured, said composition consisting essentially of a mixture of saturated fatty acids; said carried being proportioned and shaped for being immured in oral tissue in the region at the posterior fold of the tongue, and said mixture being totally supported on said carrier.

9. The invention of claim 8, wherein said carrier is flexible and laminar in form, whereby to minimize heat capacity and to conform closely to the natural contours of oral tissue.

10. The invention of claim 8, wherein said carrier is non-contaminating relative to said mixture and is comprised of an unplasticized plastic in contact with said mixture.

11. The invention of claim 10, wherein said plastic is polyvinyl chloride.

12. A temperature indicator. including adjacent members of the even-series of saturated fatty acid material enclosed in a carrier of unplasticized plastic and including means for inspecting said saturated fatty acid material.

13. The invention of claim 12, wherein said plastic is polyvinyl chloride.

14. A temperature indicator, including a plurality of mixtures of saturated fatty acids on a carrier, each of said plurality being isolated from the remainder of said plurality and consisting solely of said materials.

15. The invention of claim 14, wherein said carrier sealingly encloses each said mixtures separately and is provided with means to determine by inspection whether or not one or another or several of said mixture be in a molten condition.

16. A temperature indicator comprising a mixture of materials forming a eutectic-type phase system having stable solid compound formation, a carrier supporting said mixture, said mixture having a percentage composition, as to two components thereof, between peritectic and eutectic proportions for a binary system consisting of said two components, all said components consisting of saturated fatty acids.

17. The invention of claim 16, wherein the components of the said mixture consist of adjacent members of the even-series of saturated fatty acids.

18. The invention of claim 16, wherein said mixture includes a third component, and the percentage composition of said mixture, as to the said two components and the said third component, being such as to define a ternary mixture consisting of the three mentioned components and having a percentage composition exhibiting stable solid compound formation, said components consisting of saturated fatty acids.

19. The invention of claim 18, wherein the components of the said ternary mixture consist of adjacent members of the even-series of saturated fatty acids.

20. A temperature indicator, including a multi-component, eutectic-type phase system, said phase system consisting of a mixture of a plurality of components, and a carrier supporting said phase system, said phase system being of the type exhibiting stable solid compound formation and the percentage composition of said mixture, as to all the components thereof, being such that said mixture exhibits stable solid compound formation, said components consisting of saturated fatty acids.

21. The invention of claim 20, wherein the components of the said mixture consist of adjacent members of the even-series of saturated fatty acids.

22. A temperature indicator comprising a carrier and a mixture of saturated fatty acids on said carrier, there being a light colored symbol on said carrier and there being a dark field of color on said carrier and surrounding said symbol, said mixture being supported on said field and on said symbol in such manner as to tend to obscure said symbol from view until said mixture is substantially entirely molten.

23. A temperature indicator comprising a carrier having a field of color thereon and a symbol on said field of color, the color of said symbol being different from the color of said field, a body of heat-sensitive material covering said symbol, said heat-sensitive material changing from opaque to translucent at a predetermined temperature, said heat-sensitive material, when opaque, being of a color like that of said symbol but, when translucent, revealing the contrast between said color of said field and said color of said symbol, whereby if incompleteness of change from opacity to translucence occurs, said symbol tends to remain obscured until said change is sufficiently far advanced to assure that said predetermined temperature has been substantially attained.

24. A temperature indicator comprising a carrier, a meltable material on said carrier and covering a given area thereof, said material being clear when molten and substantially opaque when solid; said area having an indicium marked thereon and also having thereon a field of color contrasting to the said indicium and enveloping said indicium, whereby the said indicium is set off by said field of color when said material is molten and said indicium is viewed through said material, and said material having a color when opaque, contrasting relatively strongly to said field and relatively weakly to said indicium.

25. The invention of claim 24, wherein said carrier is an element having a pocket protruding therefrom, said material being supported within said pocket in the form of a layer on the bottom of said pocket.

26. A temperature indicator comprising a laminar element proportioned and shaped for insertion into a cavity of a living being, said laminar element having a pocket protruding therefrom, said pocket having an opening at the surface of said laminar element, a body of heat-sensitive material entirely located within said pocket, said body being in intimate contact with the inner surface of said pocket, a second laminar element for sealing said body in the said pocket, said second laminar element having a pocket protruding therefrom, the last said pocket being so dimensioned externally, and said second laminar element being so positioned that said second pocket nests snugly in the first-said pocket to form a space between the bottom of the said first-said pocket and the said last-said pocket, said body being located entirely within said space, and said pockets confining said body within said space.

27. The invention of claim 26, wherein the said laminar elements are sealed together throughout a region surrounding the margins of said pockets.

28. A temperature indicator comprising a laminar element having a forked portion, said forked portion being so proportioned as to fit around the fore-part of the tongue root with the prongs of said forked-portion straddling the root of the tongue, each of said prongs having a heat-sensitive body thereon adapted to change the appearance of said prongs at predetermined temperatures, each such predetermined temperature being different.

29. A body temperature indicator comprising in combination:
 (a) an indicating substantially disk-like portion adapted to be subjected to the temperature conditions to be tested,
 (b) a manipulating handle attached to and extending radially outwardly from said indicating portion,
 (c) a plurality of circumferentially spaced indicating chambers formed about the periphery of said indicating portion,
 (d) temperature sensitive material in said chambers, each having a different temperature of change of state,
 (e) and means in said chambers adapted to indicate to a user of said device the temperature of change of state of said material in one or more of said chambers.

30. A body temperature indicator comprising in combination:
 (a) an indicating substantially disk-like portion adapted to be subjected to the temperature conditions to be tested,
 (b) a manipulating handle attached to and extending radially outwardly from said indicating portion,
 (c) a plurality of circumferentially spaced indicating chambers formed about the periphery of said indicating portion,
 (d) a series of different temperature sensitive material in each of said chambers adapted to change from an opaque condition to a transparent condition upon said device being subjected to a particular temperature, (e) and means associated with said material in said chambers adapted to inform the user of the chambers in which said material has turned transparent so as to indicate the temperature to which said device has been subjected.

31. A body temperature indicator for oral application comprising in combination:
(a) a substantially disk-like top portion,
(b) a mating substantially disk-like bottom portion having a plane of abutment contact with said top portion,
(c) a radially disposed manipulating handle extending from the edge of said top and bottom portions to provide an enlarged substantially disk-like indicating portion formed integral with handle,
(d) a series of upwardly extending dome portions formed in circumferentially spaced positions adjacent the periphery of said indicating portion of said top portion of the indicator,
(e) a series of downwardly extending depressed portions formed in circumferentially spaced positions adjacent the periphery of said indicating portion of said bottom portion of said indicator positioned in register with said dome portions to provide temperature indicating chambers in said indicating portion of said device,
(f) a temperature sensitive material in said chambers adapted to change from solid to liquid when said substantially disk-like indicating portion is placed in the mouth,
(g) and eye catching indicia in said chambers to indicate the state of the material in said chambers as an indication of the temperature to which said indicator has been subjected.

References Cited

UNITED STATES PATENTS

| | | | |
|---|---|---|---|
| 446,140 | 2/1891 | Wall | 73—371 |
| 1,623,666 | 4/1927 | Ferkel | 73—358 XR |
| 1,676,536 | 7/1928 | Ferkel. | |
| 2,308,087 | 1/1943 | Lappala | 73—356 |
| 2,490,933 | 12/1949 | Tornquist et al. | 116—114 |
| 3,002,385 | 10/1961 | Wahl et al. | 73—356 |
| 3,055,759 | 9/1962 | Busby et al. | 73—356 XR |

FOREIGN PATENTS

| | | |
|---|---|---|
| 448,080 | 4/1948 | Canada. |
| 557,655 | 5/1958 | Canada. |
| 523,896 | 4/1921 | France. |

OTHER REFERENCES

Washington Post Publication June 13, 1951 (p. 19B).
Bailey, A. E. Melting and Solidification of Fats, N.Y. Interscience Publishers, 1950, pp. 64, 66, 67, 199 and 215.

LOUIS R. PRINCE, Primary Examiner

DENIS E. CORR, Assistant Examiner

U.S. Cl. X.R.
73—358